US012218424B2

(12) United States Patent
Rupakula et al.

(10) Patent No.: US 12,218,424 B2
(45) Date of Patent: *Feb. 4, 2025

(54) ELECTRONIC DEVICES HAVING ANTENNAS WITH LOADED DIELECTRIC APERTURES

(71) Applicant: Apple Inc., Cupertino, CA (US)

(72) Inventors: Bhaskara R. Rupakula, Sunnyvale, CA (US); Harish Rajagopalan, San Jose, CA (US); Hao Xu, Cupertino, CA (US); Jennifer M. Edwards, San Francisco, CA (US); Bilgehan Avser, Pacifica, CA (US); Siwen Yong, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/832,421

(22) Filed: Jun. 3, 2022

(65) Prior Publication Data

US 2022/0294119 A1 Sep. 15, 2022

Related U.S. Application Data

(63) Continuation of application No. 17/031,775, filed on Sep. 24, 2020, now Pat. No. 11,362,429.

(51) Int. Cl.

| | |
|---|---|
| ***H01Q 1/24*** | (2006.01) |
| ***H01Q 1/38*** | (2006.01) |
| ***H01Q 13/18*** | (2006.01) |

(52) U.S. Cl.

CPC ............... *H01Q 13/18* (2013.01); *H01Q 1/38* (2013.01)

(58) Field of Classification Search

CPC ............ H01Q 13/18; H01Q 1/38; H01Q 1/40; H01Q 1/422; H01Q 9/0414; H01Q 15/18; H01Q 21/065; H01Q 1/243

See application file for complete search history.

(56) References Cited

U.S. PATENT DOCUMENTS

| | | | | |
|---|---|---|---|---|
| 6,317,094 | B1 | 11/2001 | Wu et al. | |
| 6,906,674 | B2 * | 6/2005 | McKinzie, III ...... | H01Q 15/008 343/700 MS |
| 8,541,139 | B2 | 9/2013 | Ko et al. | |
| 9,130,608 | B2 | 9/2015 | Kawamura | |
| 9,496,602 | B2 * | 11/2016 | Kasar .................... | H05K 3/284 |

(Continued)

*Primary Examiner* — David E Lotter

(74) *Attorney, Agent, or Firm* — Treyz Law Group, P.C.; Michael H. Lyons

(57) ABSTRACT

An electronic device may be provided with a conductive sidewall. An aperture may be formed in the sidewall. The sidewall may have a cavity that extends from the aperture towards the interior of the device. The cavity may be filled with an injection-molded plastic substrate. A dielectric block having a dielectric constant greater than that of the injection-molded plastic substrate and the antenna layers may be embedded in the injection-molded plastic substrate. The dielectric block may at least partially overlap an antenna. The antenna may convey radio-frequency signals at a frequency greater than 10 GHz through the cavity, the dielectric block, the injection-molded plastic substrate, and the aperture. The dielectric block may increase the effective dielectric constant of the cavity, allowing the antenna to cover relatively low frequencies without increasing the size of the aperture.

20 Claims, 10 Drawing Sheets

(56) References Cited

U.S. PATENT DOCUMENTS

| | | | | |
|---|---|---|---|---|
| 9,667,290 | B2 | 5/2017 | Ouyang et al. | |
| 9,673,520 | B2 * | 6/2017 | Zhang | H01Q 9/42 |
| 9,937,526 | B2 * | 4/2018 | Shiu | H01Q 7/00 |
| 9,985,346 | B2 | 5/2018 | Baks et al. | |
| 9,991,216 | B2 | 6/2018 | Liao et al. | |
| 10,411,329 | B2 * | 9/2019 | Cardinali | H01Q 9/42 |
| 10,694,399 | B1 | 6/2020 | Tran et al. | |
| 11,362,429 | B2 * | 6/2022 | Rupakula | H01Q 1/422 |
| 2019/0097301 | A1 | 3/2019 | Wu et al. | |
| 2019/0097306 | A1 * | 3/2019 | Romano | H01Q 13/10 |
| 2019/0190162 | A1 | 6/2019 | Ohtake et al. | |
| 2019/0312347 | A1 | 10/2019 | Edwards et al. | |
| 2019/0319367 | A1 | 10/2019 | Edwards et al. | |
| 2019/0379126 | A1 | 12/2019 | Leung et al. | |
| 2020/0028238 | A1 * | 1/2020 | Park | H01Q 1/38 |
| 2020/0161745 | A1 | 5/2020 | Khripkov et al. | |
| 2020/0185802 | A1 | 6/2020 | Vilenskiy et al. | |
| 2020/0259258 | A1 | 8/2020 | Amiri et al. | |
| 2020/0280133 | A1 | 9/2020 | Avser et al. | |
| 2020/0286841 | A1 | 9/2020 | Kamgaing et al. | |
| 2022/0006486 | A1 | 1/2022 | Rajagopalan et al. | |

* cited by examiner

ELECTRONIC DEVICES HAVING ANTENNAS WITH LOADED DIELECTRIC APERTURES

This application is a continuation of U.S. patent application Ser. No. 17/031,775, filed Sep. 24, 2020, which is hereby incorporated by reference herein in its entirety.

BACKGROUND

This relates generally to electronic devices and, more particularly, to electronic devices with wireless communications circuitry.

Electronic devices often include wireless communications circuitry. For example, cellular telephones, computers, and other devices often contain antennas and wireless transceivers for supporting wireless communications.

It may be desirable to support wireless communications in millimeter wave and centimeter wave communications bands. Millimeter wave communications, which are sometimes referred to as extremely high frequency (EHF) communications, and centimeter wave communications involve communications at frequencies of about 10-300 GHz. Operation at these frequencies can support high throughputs but may raise significant challenges. For example, radio-frequency signals at millimeter and centimeter wave frequencies can be characterized by substantial attenuation and/or distortion during signal propagation through various mediums. In addition, the presence of conductive electronic device components can make it difficult to incorporate circuitry for handling millimeter and centimeter wave communications into the electronic device.

It would therefore be desirable to be able to provide electronic devices with improved wireless communications circuitry such as communications circuitry that supports millimeter and centimeter wave communications.

SUMMARY

An electronic device may be provided with wireless circuitry and a housing. The housing may have peripheral conductive housing structures and a rear wall. A display may be mounted to the peripheral conductive housing structures opposite the rear wall. An aperture may be formed in the peripheral conductive housing structures. The peripheral conductive housing structures may include a cavity that extends from the aperture towards the interior of the device.

The wireless circuitry may include a phased antenna array formed on an antenna module. The phased antenna array may include an antenna having patch elements embedded in antenna layers of the antenna module. The cavity may be filled with an injection-molded plastic substrate. The dielectric constant of the antenna layers may be greater than the dielectric constant of the injection-molded plastic substrate. A dielectric block having a dielectric constant greater than that of the injection-molded plastic substrate and the antenna layers may be embedded in the injection-molded plastic substrate. The dielectric block may at least partially overlap the antenna. The antenna may convey radio-frequency signals at a frequency greater than 10 GHz through the cavity, the dielectric block, the injection-molded plastic substrate, and the aperture. The antenna may excite a resonant mode of the cavity so the cavity forms a resonant waveguide. The dielectric block may increase the effective dielectric constant of the cavity, allowing the antenna to cover relatively low frequencies such as frequencies around 24.5 GHz without increasing the size of the aperture.

DETAILED DESCRIPTION

Figure 1:
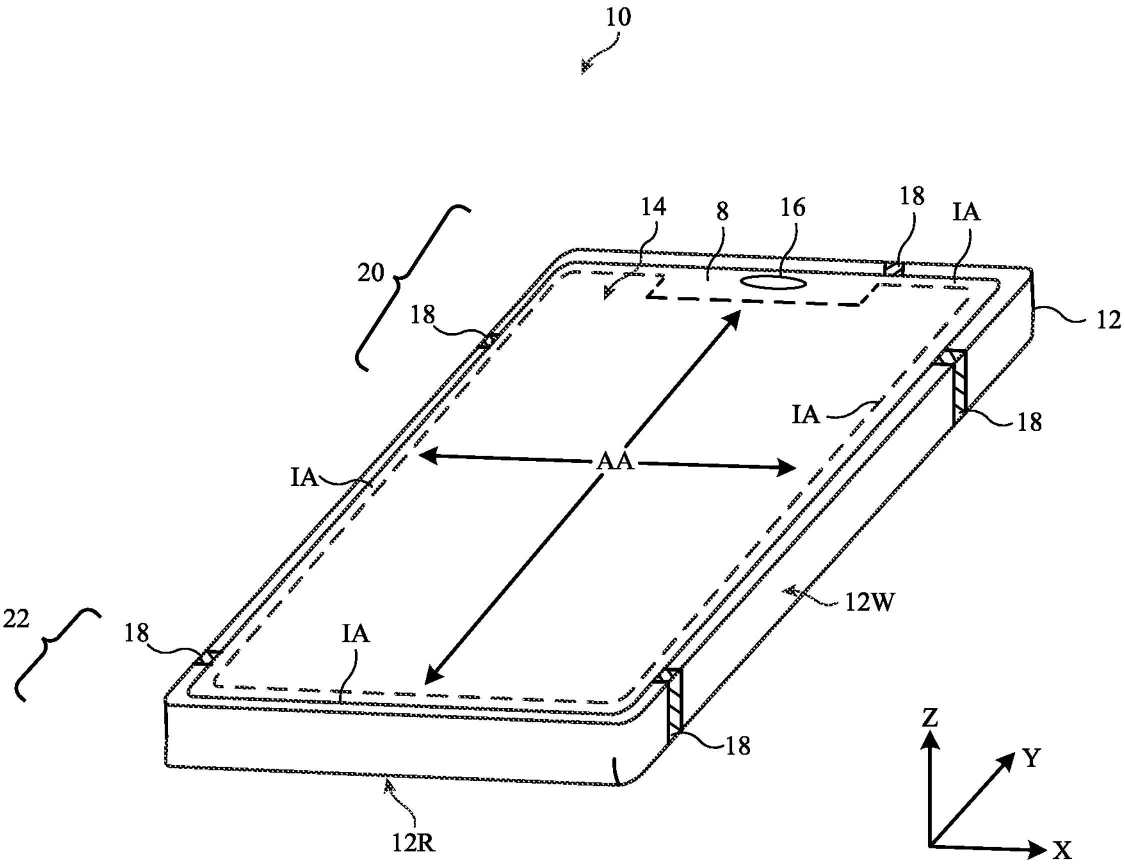
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region or notch that extends into active area AA (e.g., at speaker port 16). Active area AA may, for example, be defined by the lateral area of a display module for display 14 (e.g., a display module that includes pixel circuitry, touch sensor circuitry, etc.).

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
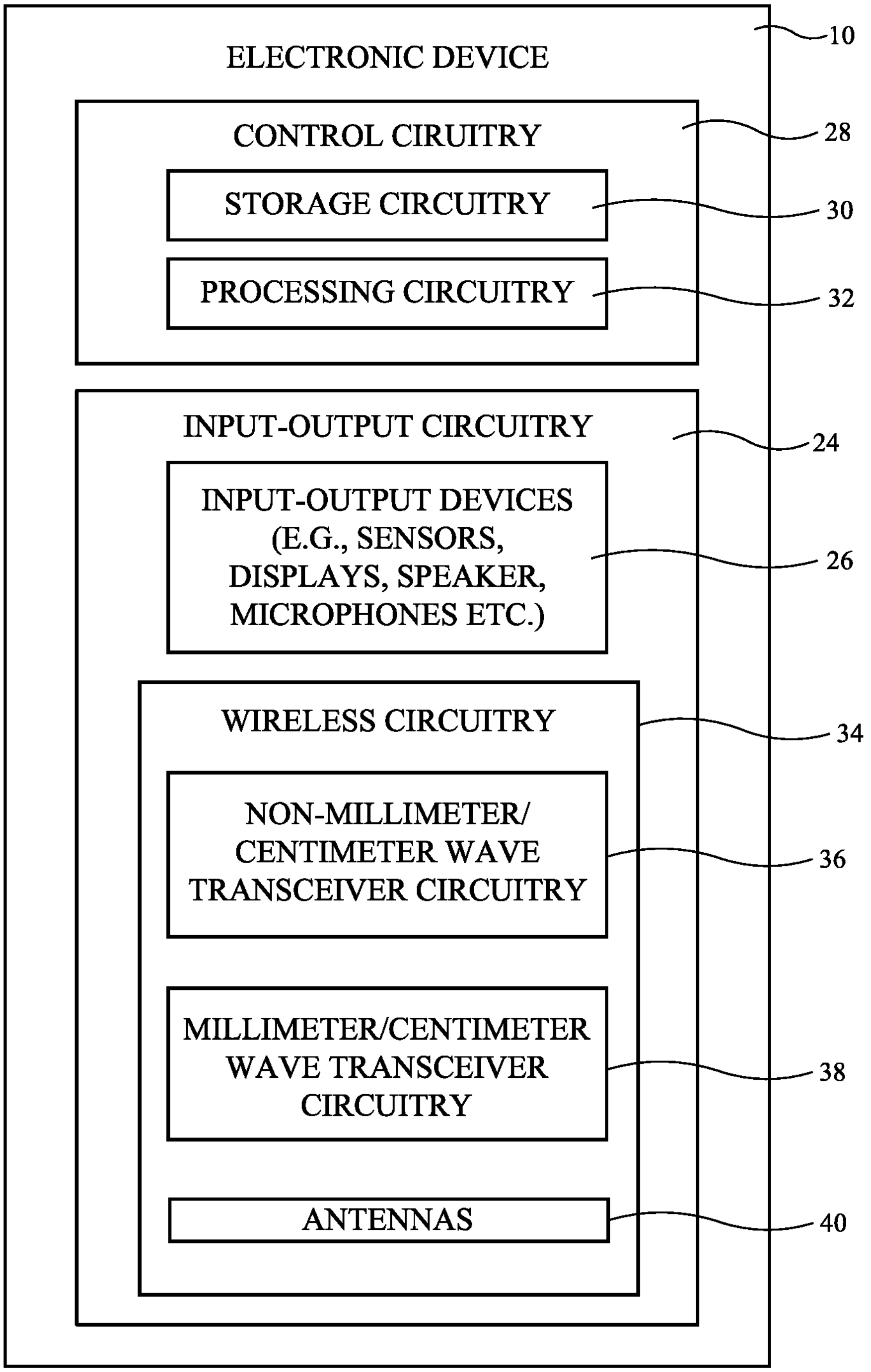
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include millimeter and centimeter wave transceiver circuitry such as millimeter/centimeter wave transceiver circuitry 38. Millimeter/centimeter wave transceiver circuitry 38 may support communications at frequencies between about 10 GHz and 300 GHz. For example, millimeter/centimeter wave transceiver circuitry 38 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 38 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 38 may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz. Millimeter/centimeter wave transceiver circuitry 38 may be formed from one or more integrated circuits (e.g., multiple integrated circuits mounted on a common printed circuit in a system-in-package device, one or more integrated circuits mounted on different substrates, etc.).

Millimeter/centimeter wave transceiver circuitry 38 (sometimes referred to herein simply as transceiver circuitry 38 or millimeter/centimeter wave circuitry 38) may perform spatial ranging operations using radio-frequency signals at millimeter and/or centimeter wave frequencies that are transmitted and received by millimeter/centimeter wave transceiver circuitry 38. The received signals may be a version of the transmitted signals that have been reflected off of external objects and back towards device 10. Control circuitry 28 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 28 may also process the transmitted and received signals to identify a two or three-dimensional spatial location of the external objects relative to device 10.

Spatial ranging operations performed by millimeter/centimeter wave transceiver circuitry 38 are unidirectional. If desired, millimeter/centimeter wave transceiver circuitry 38 may also perform bidirectional communications with external wireless equipment such as external wireless equipment 10 (e.g., over a bi-directional millimeter/centimeter wave wireless communications link). The external wireless equipment may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 38 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 34 may include transceiver circuitry for handling communications at frequencies below 10 GHz such as non-millimeter/centimeter wave transceiver circuitry 36. For example, non-millimeter/centimeter wave transceiver circuitry 36 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by the radio-frequency transceiver circuitry may sometimes be referred to herein as frequency bands or simply as "bands," and may span corresponding ranges of frequencies. Non-millimeter/centimeter wave transceiver circuitry 36 and millimeter/centimeter wave transceiver circuitry 38 may each include one or more integrated circuits, power amplifier circuitry, low-noise input amplifiers, passive radio-frequency components, switching circuitry, transmission line structures, and other circuitry for handling radio-frequency signals.

In general, the transceiver circuitry in wireless circuitry 34 may cover (handle) any desired frequency bands of interest. As shown in FIG. 2, wireless circuitry 34 may include antennas 40. The transceiver circuitry may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 38 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 36 and another type of antenna may be used in conveying radio-frequency signals at millimeter and/or centimeter wave frequencies for millimeter/centimeter wave transceiver circuitry 38. Antennas 40 that are used to convey radio-frequency signals at millimeter and centimeter wave frequencies may be arranged in one or more phased antenna arrays.

Figure 3:
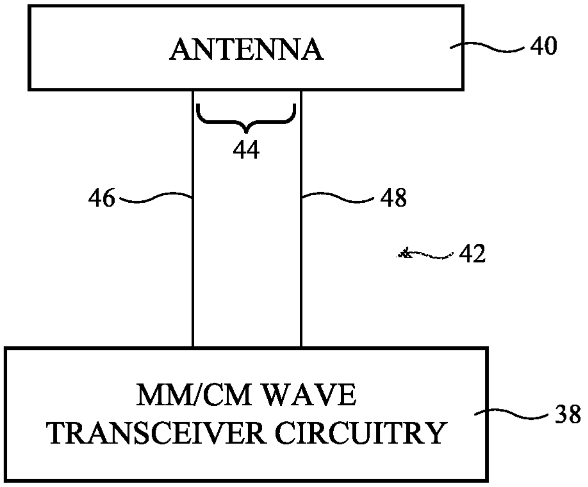
FIG. 3 is a schematic diagram of illustrative wireless circuitry in accordance with some embodiments.

A schematic diagram of an antenna 40 that may be formed in a phased antenna array for conveying radio-frequency signals at millimeter and centimeter wave frequencies is shown in FIG. 3. As shown in FIG. 3, antenna 40 may be coupled to millimeter/centimeter (MM/CM) wave transceiver circuitry 38. Millimeter/centimeter wave transceiver circuitry 38 may be coupled to antenna feed 44 of antenna 40 using a transmission line path that includes radio-frequency transmission line 42. Radio-frequency transmission line 42 may include a positive signal conductor such as signal conductor 46 and may include a ground conductor such as ground conductor 48. Ground conductor 48 may be coupled to the antenna ground for antenna 40 (e.g., over a ground antenna feed terminal of antenna feed 44 located at the antenna ground). Signal conductor 46 may be coupled to the antenna resonating element for antenna 40. For example, signal conductor 46 may be coupled to a positive antenna feed terminal of antenna feed 44 located at the antenna resonating element.

In another suitable arrangement, antenna 40 may be a probe-fed antenna that is fed using a feed probe. In this arrangement, antenna feed 44 may be implemented as a feed probe. Signal conductor 46 may be coupled to the feed probe. Radio-frequency transmission line 42 may convey radio-frequency signals to and from the feed probe. When radio-frequency signals are being transmitted over the feed probe and the antenna, the feed probe may excite the resonating element for the antenna (e.g., may excite electromagnetic resonant modes of a dielectric antenna resonating element for antenna 40). The resonating element may radiate the radio-frequency signals in response to excitation by the feed probe. Similarly, when radio-frequency signals are received by the antenna (e.g., from free space), the radio-frequency signals may excite the resonating element for the antenna (e.g., may excite electromagnetic resonant modes of the dielectric antenna resonating element for antenna 40). This may produce antenna currents on the feed probe and the corresponding radio-frequency signals may be passed to the transceiver circuitry over the radio-frequency transmission line.

Radio-frequency transmission line 42 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 38 to antenna feed 44. Filter circuitry, switching circuitry, impedance matching circuitry, phase shifter circuitry, amplifier circuitry, and/or other circuitry may be interposed on radio-frequency transmission line 42, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
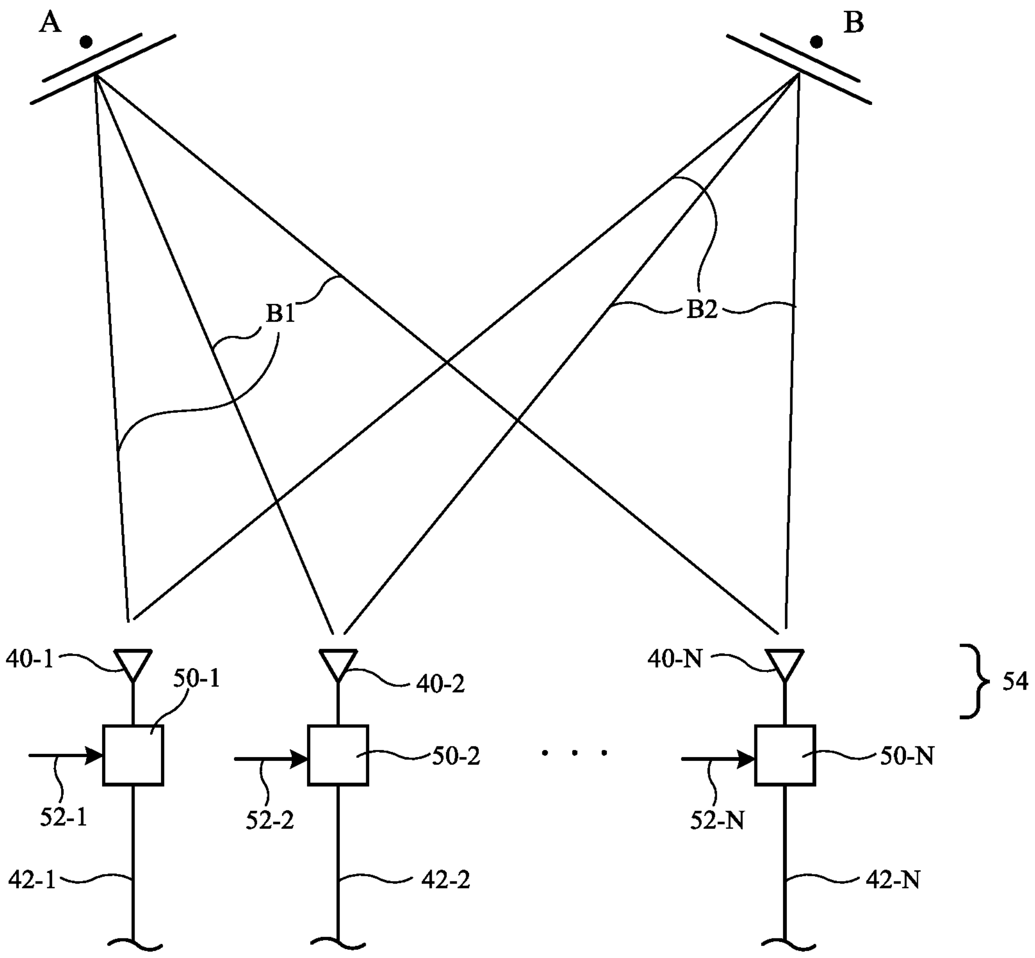
FIG. 4 is a diagram of an illustrative phased antenna array in accordance with some embodiments.

FIG. 4 shows how antennas 40 for handling radio-frequency signals at millimeter and centimeter wave frequencies may be formed in a phased antenna array. As shown in FIG. 4, phased antenna array 54 (sometimes referred to herein as array 54, antenna array 54, or array 54 of antennas 40) may be coupled to radio-frequency transmission lines 42. For example, a first antenna 40-1 in phased antenna array 54 may be coupled to a first radio-frequency transmission line 42-1, a second antenna 40-2 in phased antenna array 54 may be coupled to a second radio-frequency transmission line 42-2, an Nth antenna 40-N in phased antenna array 54 may be coupled to an Nth radio-frequency transmission line 42-N, etc. While antennas 40 are described herein as forming a phased antenna array, the antennas 40 in phased antenna array 54 may sometimes also be referred to as collectively forming a single phased array antenna.

Antennas 40 in phased antenna array 54 may be arranged in any desired number of rows and columns or in any other desired pattern (e.g., the antennas need not be arranged in a grid pattern having rows and columns). During signal transmission operations, radio-frequency transmission lines 42 may be used to supply signals (e.g., radio-frequency signals such as millimeter wave and/or centimeter wave signals) from millimeter/centimeter wave transceiver circuitry 38 (FIG. 3) to phased antenna array 54 for wireless transmission. During signal reception operations, radio-frequency transmission lines 42 may be used to supply signals received at phased antenna array 54 (e.g., from external wireless equipment or transmitted signals that have been reflected off of external objects) to millimeter/centimeter wave transceiver circuitry 38 (FIG. 3).

The use of multiple antennas 40 in phased antenna array 54 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 50 (e.g., a first phase and magnitude controller 50-1 interposed on radio-frequency transmission line 42-1 may control phase and magnitude for radio-frequency signals handled by antenna 40-1, a second phase and magnitude controller 50-2 interposed on radio-frequency transmission line 42-2 may control phase and magnitude for radio-frequency signals handled by antenna 40-2, an Nth phase and magnitude controller 50-N interposed on radio-frequency transmission line 42-N may control phase and magnitude for radio-frequency signals handled by antenna 40-N, etc.).

Phase and magnitude controllers 50 may each include circuitry for adjusting the phase of the radio-frequency signals on radio-frequency transmission lines 42 (e.g., phase shifter circuits) and/or circuitry for adjusting the magnitude of the radio-frequency signals on radio-frequency transmission lines 42 (e.g., power amplifier and/or low noise amplifier circuits). Phase and magnitude controllers 50 may sometimes be referred to collectively herein as beam steering circuitry (e.g., beam steering circuitry that steers the beam of radio-frequency signals transmitted and/or received by phased antenna array 54).

Phase and magnitude controllers 50 may adjust the relative phases and/or magnitudes of the transmitted signals that are provided to each of the antennas in phased antenna array 54 and may adjust the relative phases and/or magnitudes of the received signals that are received by phased antenna array 54. Phase and magnitude controllers 50 may, if desired, include phase detection circuitry for detecting the phases of the received signals that are received by phased antenna array 54. The term "beam" or "signal beam" may be used herein to collectively refer to wireless signals that are transmitted and received by phased antenna array 54 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 50 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 50 are adjusted to produce a second set of phases and/or magnitudes for the transmitted signals, the transmitted signals will form a transmit beam as shown by beam B2 that is oriented in the direction of point B. Similarly, if phase and magnitude controllers 50 are adjusted to produce the first set of phases and/or magnitudes, radio-frequency signals (e.g., radio-frequency signals in a receive beam) may be received from the direction of point A, as shown by beam B1. If phase and magnitude controllers 50 are adjusted to produce the second set of phases and/or magnitudes, radio-frequency signals may be received from the direction of point B, as shown by beam B2.

Each phase and magnitude controller 50 may be controlled to produce a desired phase and/or magnitude based on a corresponding control signal 52 received from control circuitry 28 of FIG. 2 (e.g., the phase and/or magnitude provided by phase and magnitude controller 50-1 may be controlled using control signal 52-1, the phase and/or magnitude provided by phase and magnitude controller 50-2 may be controlled using control signal 52-2, etc.). If desired, the control circuitry may actively adjust control signals 52 in real time to steer the transmit or receive beam in different desired directions over time. Phase and magnitude controllers 50 may provide information identifying the phase of received signals to control circuitry 28 if desired.

When performing wireless communications using radio-frequency signals at millimeter and centimeter wave frequencies, the radio-frequency signals are conveyed over a line of sight path between phased antenna array 54 and external communications equipment. If the external object is located at point A of FIG. 4, phase and magnitude controllers 50 may be adjusted to steer the signal beam towards point A (e.g., to steer the pointing direction of the signal beam towards point A). Phased antenna array 54 may transmit and receive radio-frequency signals in the direction of point A. Similarly, if the external communications equipment is located at point B, phase and magnitude controllers 50 may be adjusted to steer the signal beam towards point B (e.g., to steer the pointing direction of the signal beam towards point B). Phased antenna array 54 may transmit and receive radio-frequency signals in the direction of point B. In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 54 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Any desired antenna structures may be used for implementing antennas 40. In one suitable arrangement that is sometimes described herein as an example, patch antenna structures may be used for implementing antennas 40. Antennas 40 that are implemented using patch antenna structures may sometimes be referred to herein as patch antennas. An illustrative patch antenna that may be used in phased antenna array 54 of FIG. 4 is shown in FIG. 5.

Figure 5:
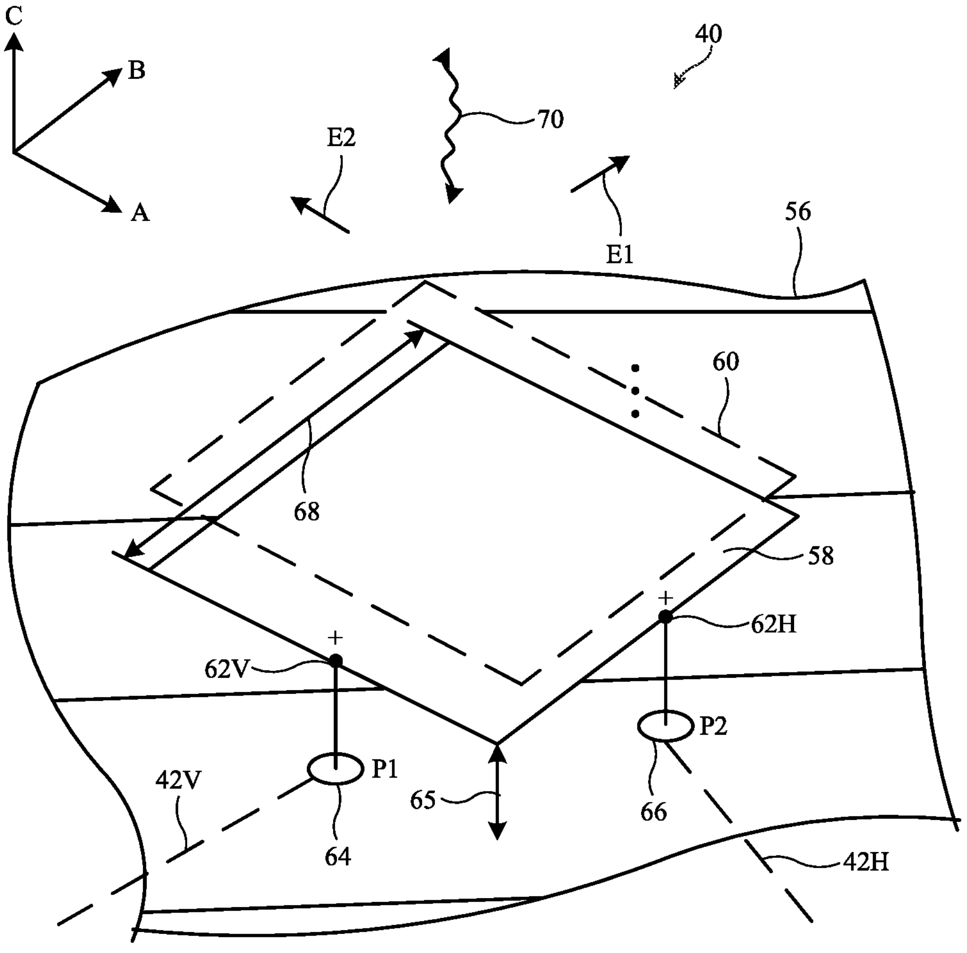
FIG. 5 is a perspective view of illustrative patch antenna structures in accordance with some embodiments.

As shown in FIG. 5, antenna 40 may have a patch antenna resonating element 58 that is separated from and parallel to a ground plane such as antenna ground 56. Patch antenna resonating element 58 may lie within a plane such as the A-B plane of FIG. 5 (e.g., the lateral surface area of element 58 may lie in the A-B plane). Patch antenna resonating element 58 may sometimes be referred to herein as patch 58, patch element 58, patch resonating element 58, antenna resonating element 58, or resonating element 58. Antenna ground 56 may lie within a plane that is parallel to the plane of patch element 58. Patch element 58 and antenna ground 56 may therefore lie in separate parallel planes that are separated by distance 65. Patch element 58 and antenna ground 56 may be formed from conductive traces patterned on a dielectric substrate such as a rigid or flexible printed circuit board substrate, metal foil, stamped sheet metal, electronic device housing structures, or any other desired conductive structures.

The length of the sides of patch element 58 may be selected so that antenna 40 resonates at a desired operating frequency. For example, the sides of patch element 58 may each have a length 68 that is approximately equal to half of the wavelength of the signals conveyed by antenna 40 (e.g., the effective wavelength given the dielectric properties of the materials surrounding patch element 58). In one suitable arrangement, length 68 may be between 0.8 mm and 1.2 mm (e.g., approximately 1.1 mm) for covering a millimeter wave frequency band between 57 GHz and 70 GHz or between 1.6 mm and 2.2 mm (e.g., approximately 1.85 mm) for covering a millimeter wave frequency band between 37 GHz and 41 GHz, as just two examples.

The example of FIG. 5 is merely illustrative. Patch element 58 may have a square shape in which all of the sides of patch element 58 are the same length or may have a different rectangular shape. Patch element 58 may be formed in other shapes having any desired number of straight and/or curved edges.

To enhance the polarizations handled by antenna 40, antenna 40 may be provided with multiple feeds. As shown in FIG. 5, antenna 40 may have a first feed at antenna port P1 that is coupled to a first radio-frequency transmission line 42 such as radio-frequency transmission line 42V. Antenna 40 may have a second feed at antenna port P2 that is coupled to a second radio-frequency transmission line 42 such as radio-frequency transmission line 42H. The first antenna feed may have a first ground feed terminal coupled to antenna ground 56 (not shown in FIG. 5 for the sake of clarity) and a first positive antenna feed terminal 62V coupled to patch element 58. The second antenna feed may have a second ground feed terminal coupled to antenna ground 56 (not shown in FIG. 5 for the sake of clarity) and a second positive antenna feed terminal 62H on patch element 58.

Holes or openings such as openings 64 and 66 may be formed in antenna ground 56. Radio-frequency transmission line 42V may include a vertical conductor (e.g., a conductive through-via, conductive pin, metal pillar, solder bump, combinations of these, or other vertical conductive interconnect structures) that extends through opening 64 to positive antenna feed terminal 62V on patch element 58. Radio-frequency transmission line 42H may include a vertical conductor that extends through opening 66 to positive antenna feed terminal 62H on patch element 58. This example is merely illustrative and, if desired, other transmission line structures may be used (e.g., coaxial cable structures, stripline transmission line structures, etc.).

When using the first antenna feed associated with port P1, antenna 40 may transmit and/or receive radio-frequency signals having a first polarization (e.g., the electric field E1 of radio-frequency signals 70 associated with port P1 may be oriented parallel to the B-axis in FIG. 5). When using the antenna feed associated with port P2, antenna 40 may transmit and/or receive radio-frequency signals having a second polarization (e.g., the electric field E2 of radio-frequency signals 70 associated with port P2 may be oriented parallel to the A-axis of FIG. 5 so that the polarizations associated with ports P1 and P2 are orthogonal to each other).

One of ports P1 and P2 may be used at a given time so that antenna 40 operates as a single-polarization antenna or both ports may be operated at the same time so that antenna 40 operates with other polarizations (e.g., as a dual-polarization antenna, a circularly-polarized antenna, an elliptically-polarized antenna, etc.). If desired, the active port may be changed over time so that antenna 40 can switch between covering vertical or horizontal polarizations at a given time. Ports P1 and P2 may be coupled to different phase and magnitude controllers 50 (FIG. 3) or may both be coupled to the same phase and magnitude controller 50. If desired, ports P1 and P2 may both be operated with the same phase and magnitude at a given time (e.g., when antenna 40 acts as a dual-polarization antenna). If desired, the phases and magnitudes of radio-frequency signals conveyed over ports P1 and P2 may be controlled separately and varied over time so that antenna 40 exhibits other polarizations (e.g., circular or elliptical polarizations).

If care is not taken, antennas 40 such as dual-polarization patch antennas of the type shown in FIG. 5 may have insufficient bandwidth for covering relatively wide ranges of frequencies. It may be desirable for antenna 40 to be able to cover both a first frequency band and a second frequency band at frequencies higher than the first frequency band. In one suitable arrangement that is described herein as an example, the first frequency band may include frequencies from about 24-30 GHz whereas the second frequency band includes frequencies from about 37-40 GHz. In these scenarios, patch element 58 may not exhibit sufficient bandwidth on its own to cover an entirety of both the first and second frequency bands.

If desired, antenna 40 may include one or more additional patch elements 60 that are stacked over patch element 58. Each patch element 60 may partially or completely overlap patch element 58. Patch elements 60 may have sides with lengths other than length 68, which configure patch elements 60 to radiate at different frequencies than patch element 58, thereby extending the overall bandwidth of antenna 40. Patch elements 60 may include directly-fed patch elements (e.g., patch elements with positive antenna feed terminals directly coupled to transmission lines) and/or parasitic antenna resonating elements that are not directly fed by antenna feed terminals and transmission lines. One or more patch elements 60 may be coupled to patch element 58 by one or more conductive through vias if desired (e.g., so that at least one patch element 60 and patch element 58 are coupled together as a single directly fed resonating element). In scenarios where patch elements 60 are directly fed, patch elements 60 may include two positive antenna feed terminals for conveying signals with different (e.g., orthogonal) polarizations and/or may include a single positive antenna feed terminal for conveying signals with a single polarization.

The combined resonance of patch element 58 and each of patch elements 60 may configure antenna 40 to radiate with satisfactory antenna efficiency across an entirety of both the first and second frequency bands (e.g., from 24-30 GHz and from 37-40 GHz). The example of FIG. 5 is merely illustrative. Patch elements 60 may be omitted if desired. Patch elements 60 may be rectangular, square, cross-shaped, or any other desired shape having any desired number of straight and/or curved edges. Patch element 60 may be provided at any desired orientation relative to patch element 58. Antenna 40 may have any desired number of feeds. Other antenna types may be used if desired (e.g., dipole antennas, monopole antennas, slot antennas, etc.).

Figure 6:
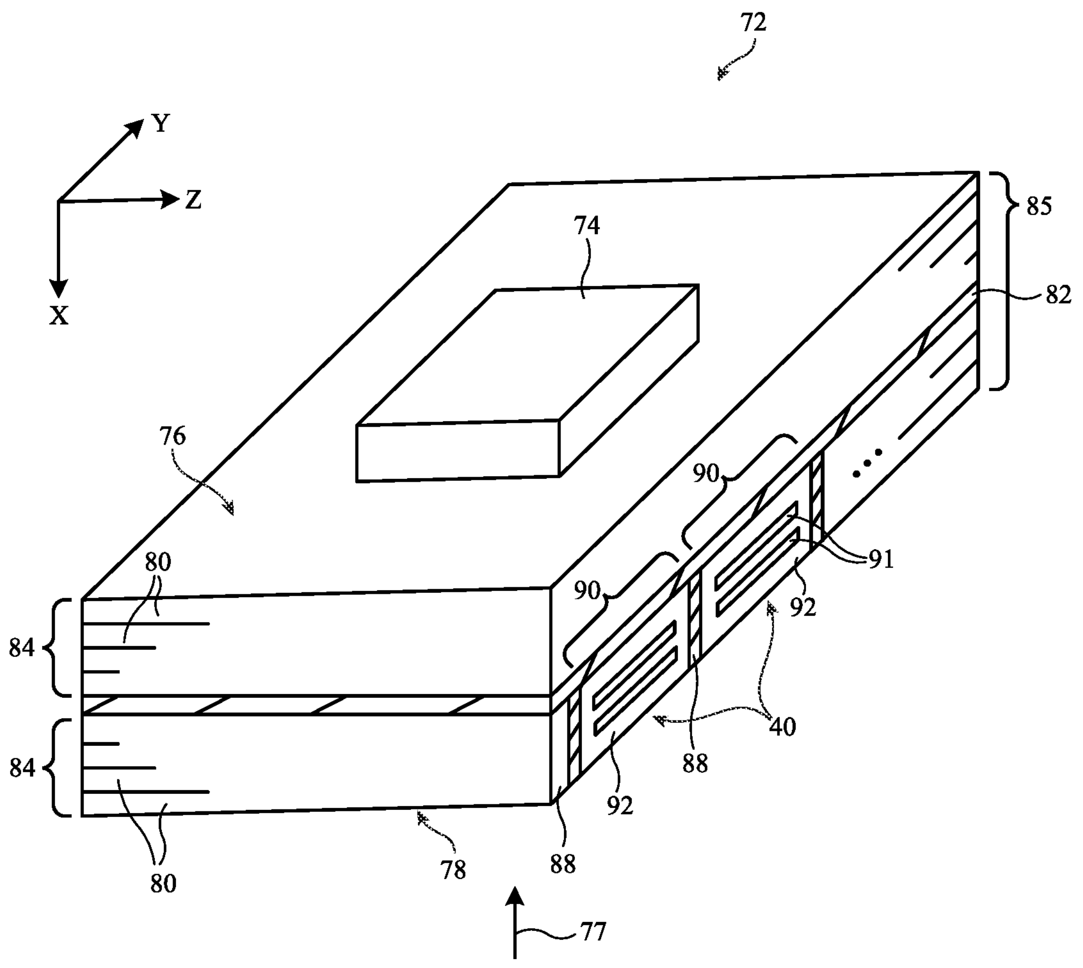
FIG. 6 is a perspective view of an illustrative antenna module in accordance with some embodiments.

If desired, phased antenna array 54 may be integrated with other circuitry such as a radio-frequency integrated circuit to form an integrated antenna module. FIG. 6 is a rear perspective view of an illustrative integrated antenna module for handling signals at frequencies greater than 10 GHz in device 10. As shown in FIG. 6, device 10 may be provided with an integrated antenna module such as integrated antenna module 72 (sometimes referred to herein as antenna module 72 or module 72).

Antenna module 72 may include phased antenna array 54 of antennas 40 formed on a dielectric substrate such as substrate 85. Substrate 85 may be, for example, a rigid or printed circuit board, flexible printed circuit, or other dielectric substrate. Substrate 85 may be a stacked dielectric substrate that includes multiple stacked dielectric layers 80 (e.g., multiple layers of printed circuit board substrate such as multiple layers of fiberglass-filled epoxy, rigid printed circuit board material, flexible printed circuit board material, ceramic, plastic, glass, or other dielectrics). Phased antenna array 54 may include any desired number of antennas 40 arranged in any desired pattern. Each antenna 40 may include a respective set of patch elements 91 (e.g., patch elements such as patch elements 58 and/or 60 of FIG. 5).

One or more electrical components 74 may be mounted on (top) surface 76 of substrate 85 (e.g., the surface of substrate 85 opposite surface 78 and patch elements 91). Component 74 may, for example, include an integrated circuit (e.g., an integrated circuit chip) or other circuitry mounted to surface 76 of substrate 85. Component 74 may include radio-frequency components such as amplifier circuitry, phase shifter circuitry (e.g., phase and magnitude controllers 50 of FIG. 4), and/or other circuitry that operates on radio-frequency signals. Component 74 may sometimes be referred to herein as radio-frequency integrated circuit (RFIC) 74. However, this is merely illustrative and, in general, the circuitry of RFIC 74 need not be formed on an integrated circuit.

The dielectric layers 80 in substrate 85 may include a first set of layers 86 (sometimes referred to herein as antenna layers 86) and a second set of layers 84 (sometimes referred to herein as transmission line layers 84). Ground traces 82 may separate antenna layers 86 from transmission line layers 84. Conductive traces or other metal layers on transmission line layers 84 may be used in forming transmission line structures such as radio-frequency transmission lines 42 of FIG. 4 (e.g., radio-frequency transmission lines 42V and 42H of FIG. 5). For example, conductive traces on transmission line layers 84 may be used in forming stripline or microstrip transmission lines that are coupled between the antenna feeds for antennas 40 (e.g., over conductive vias extending through antenna layers 86) and RFIC 74 (e.g., over conductive vias extending through transmission line layers 84). A board-to-board connector (not shown) may couple RFIC 74 to the baseband and/or transceiver circuitry for phased antenna array 54 (e.g., millimeter/centimeter wave transceiver circuitry 38 of FIG. 3).

If desired, each antenna 40 in phased antenna array 54 may be laterally surrounded by fences of conductive vias 88 (e.g., conductive vias extending parallel to the X-axis and through antenna layers 86 of FIG. 6). The fences of conductive vias 88 for phased antenna array 54 may be shorted to ground traces 82 so that the fences of conductive vias 88 are held at a ground potential. Conductive vias 88 may extend downwards to surface 78 or to the same dielectric layer 80 as the bottom-most conductive patch 91 in phased antenna array 54. The fences of conductive vias 88 may be opaque at the frequencies covered by antennas 40. Each antenna 40 may lie within a respective antenna cavity 92 having conductive cavity walls defined by a corresponding set of fences of conductive vias 88 in antenna layers 86. The fences of conductive vias 88 may help to ensure that each antenna 40 in phased antenna array 54 is suitably isolated, for example. Phased antenna array 54 may include a number of antenna unit cells 90. Each antenna unit cell 90 may include respective fences of conductive vias 88, a respective antenna cavity 92 defined by (e.g., laterally surrounded by) those fences of conductive vias, and a respective antenna 40 (e.g., set of patch elements 91) within that antenna cavity 92.

Figure 7:
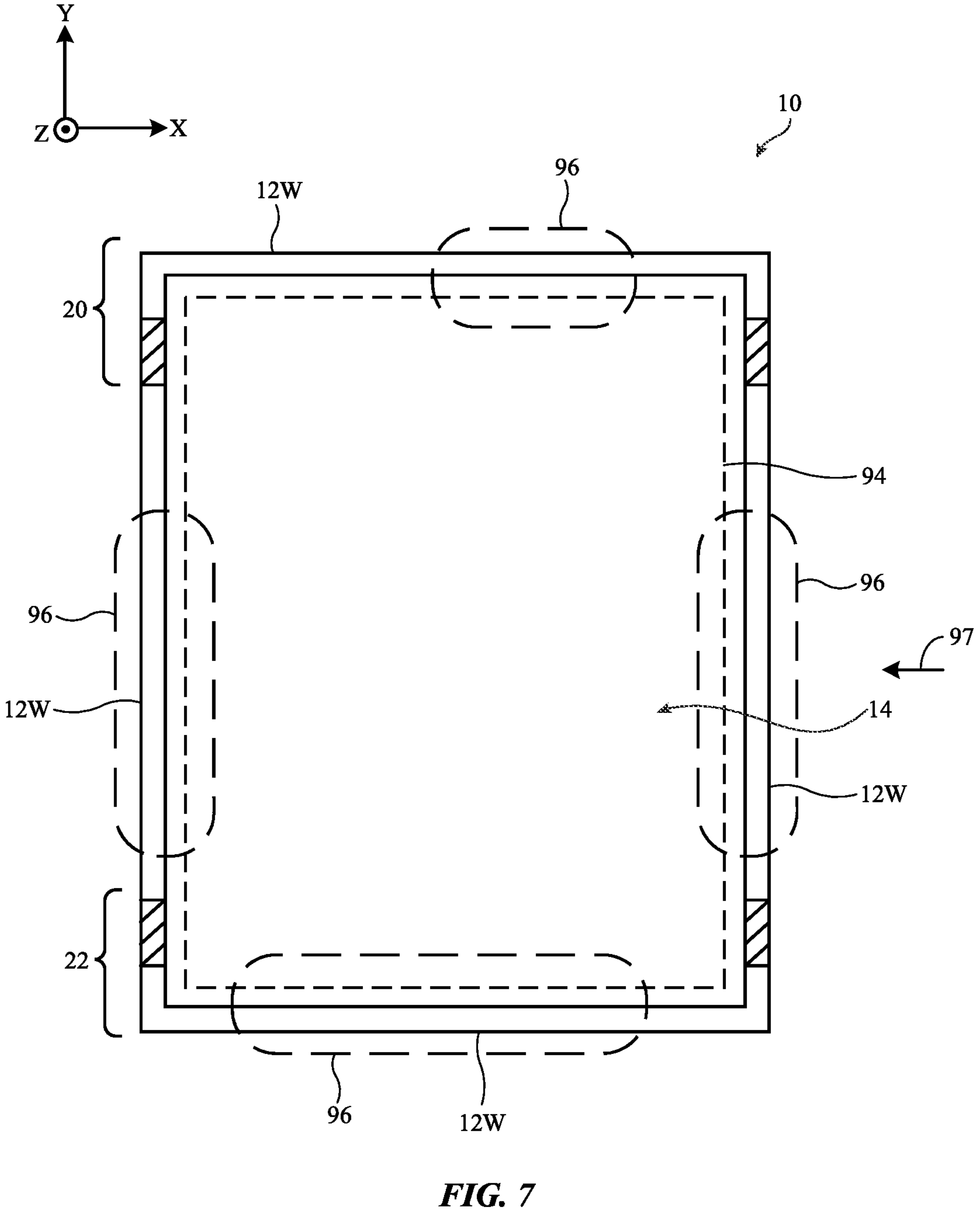
FIG. 7 is a front view of an illustrative electronic device showing exemplary locations for mounting an antenna module that radiates through peripheral conductive housing structures in accordance with some embodiments.

Antenna module 72 may be mounted at any desired location within device 10 for conveying radio-frequency signals with external wireless communications equipment. In one suitable arrangement that is described herein as an example, antenna module 72 may convey radio-frequency signals through the peripheral sidewalls of device 10. FIG. 7 is a top view of device 10 showing different illustrative locations for positioning antenna module 72 to convey radio-frequency signals through the peripheral sidewalls of device 10.

As shown in FIG. 7, device 10 may include peripheral conductive housing structures 12W (e.g., four peripheral conductive housing sidewalls that surround the rectangular periphery of device 10). In other words, device 10 may have a length (parallel to the Y-axis), a width that is less than the length (parallel to the X-axis), and a height that is less than the width (parallel to the Z-axis). Peripheral conductive housing structures 12W may extend across the length and the width of device 10 (e.g., peripheral conductive housing structures 12W may include a first conductive sidewall extending along the left edge of device 10, a second conductive sidewall extending along the top edge of device 10, a third conductive sidewall extending along the right edge of device 10, and a fourth conductive sidewall extending along the bottom edge of device 10). Peripheral conductive housing structures 12W may also extend across the height of device 10 (e.g., as shown in the perspective view of FIG. 1).

As shown in FIG. 7, display 14 may have a display module such as display module 94. Peripheral conductive housing structures 12W may run around the periphery of display module 94 (e.g., along all four sides of device 10). Display module 94 may be covered by a display cover layer (not shown). The display cover layer may extend across the entire length and width of device 10 and may, if desired, be mounted to or otherwise supported by peripheral conductive housing structures 12W.

Display module 94 (sometimes referred to as a display panel, active display circuitry, or active display structures) may be any desired type of display panel and may include pixels formed from light-emitting diodes (LEDs), organic LEDs (OLEDs), plasma cells, electrowetting pixels, electrophoretic pixels, liquid crystal display (LCD) components, or other suitable pixel structures. The lateral area of display module 94 may, for example, determine the size of the active area of display 14 (e.g., active area AA of FIG. 1). Display module 94 may include active light emitting components, touch sensor components (e.g., touch sensor electrodes), force sensor components, and/or other active components. Because display module 94 includes conductive components, display module 94 may block radio-frequency signals from passing through display 14. Antenna module 72 of FIG. 6 may therefore be located within regions 96 around the periphery of display module 94 and device 10. One or more regions 96 of FIG. 7 may, for example, include a corresponding antenna module 72. Apertures may be formed within peripheral conductive housing structures 12W within regions 96 to allow the antennas in antenna module 72 to convey radio-frequency signals to and/or from the exterior of device 10 (e.g., through the apertures).

In the example of FIG. 7, each region 96 is located along a respective side (edge) of device 10 (e.g., along the top conductive sidewall of device 10 within region 20, along the bottom conductive sidewall of device 10 within region 22, along the left conductive sidewall of device 10, and along the right conductive sidewall of device 10). Antennas mounted in these regions may provide millimeter and centimeter wave communications coverage for device 10 around the lateral periphery of device 10. When combined with the contribution of antennas that radiate through the front and/or rear faces of device 10, the antennas in device 10 may provide a full sphere of millimeter/centimeter wave coverage around device 10. The example of FIG. 7 is merely illustrative. Each edge of device 10 may include multiple regions 96 and some edges of device 10 may include no regions 96. If desired, additional regions 96 may be located elsewhere on device 10.

Figure 8:
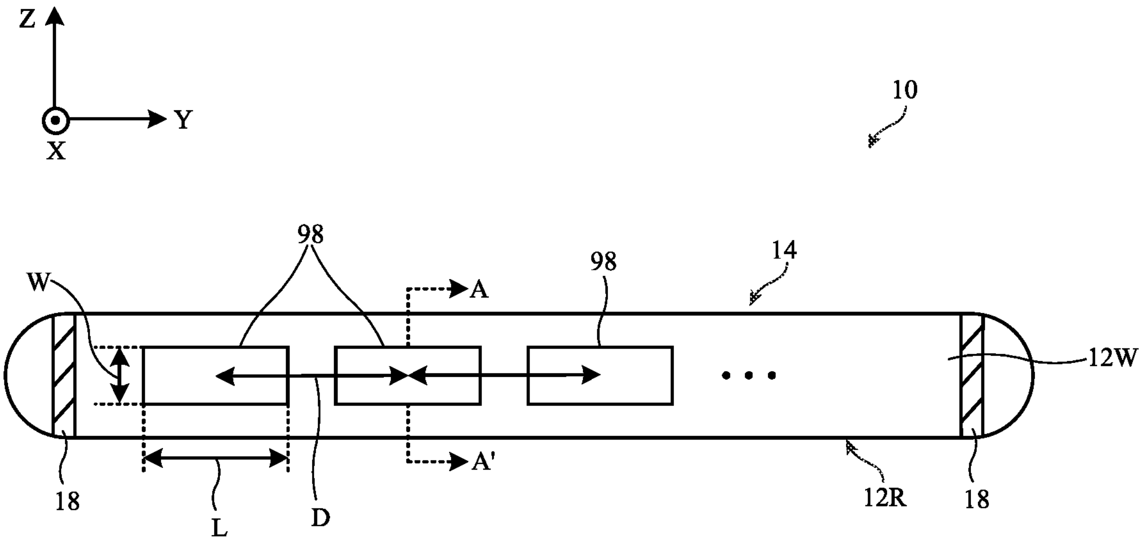
FIG. 8 is a side view of an illustrative electronic device having peripheral conductive housing structures with apertures that are aligned with an antenna module in accordance with some embodiments.

FIG. 8 is a side view showing how apertures may be formed in peripheral conductive housing structures 12W to allow the antennas in antenna module 72 to convey radio-frequency signals to and/or from the exterior of device 10 (within a given region 96 of FIG. 7). The example of FIG. 8 illustrates apertures that may be formed in the right-most region 96 of FIG. 7 (e.g., along the right conductive sidewall as viewed in the direction of arrow 97 of FIG. 7). Similar apertures may be formed in any desired conductive sidewall of device 10.

As shown in FIG. 8, device 10 may have a first (front) face defined by display 14 and a second (rear) face defined by rear housing wall 12R. Display 14 may be mounted to peripheral conductive structures 12W, which extend from the rear face to the front face and around the periphery of device 10. One or more gaps 18 may extend from the rear face to the front face to divide peripheral conductive housing structures 12W into different segments.

One or more antenna apertures such as apertures 98 may be formed in peripheral conductive housing structures 12W. Apertures 98 (sometimes referred to herein as slots 98) may be filled with one or more dielectric materials and may have edges that are defined by the conductive material in peripheral conductive housing structures 12W. Antenna module 72 of FIG. 6 may be mounted within the interior of device 10 (e.g., with the antennas facing apertures 98). Each aperture 98 may be aligned with a respective antenna 40 in the antenna module.

The center of each aperture 98 may be separated from the center of one or two adjacent apertures 98 by distance D. Distance D may, for example, be the distance between the center of adjacent antenna unit cells 90 in phased antenna array 54 (FIG. 6). Distance D may be approximately equal to (e.g., within 15% of) one-half of the effective wavelength corresponding to a frequency in the frequency band of operation of antennas 40. In the example where antennas 40 are dual-band antennas for covering both the first frequency band from 24-30 GHz and the second frequency band from 37-40 GHz, distance D may be approximately equal to one-half of the effective wavelength corresponding to a frequency in the first frequency band, a frequency in the second frequency band, or a frequency between the first and second frequency bands (e.g., distance D may be approximately 3-7 mm, 3-6 mm, 5 mm, or other distances). The effective wavelength is equal to a free space wavelength multiplied by a constant factor determined by the dielectric constant of substrate 85 (FIG. 6). Configuring distance D in this way may allow the phased antenna array to perform beam steering operations with satisfactory antenna gain.

In addition to allowing radio-frequency signals to pass between the antenna module and the exterior of device 10, apertures 98 of FIG. 8 may also form waveguide radiators for the antennas in the antenna module. For example, the radio-frequency signals conveyed by the antennas may excite one or more electromagnetic waveguide (cavity) modes within apertures 98, which contribute to the overall resonance and frequency response of the antennas in the antenna module.

Figure 9:
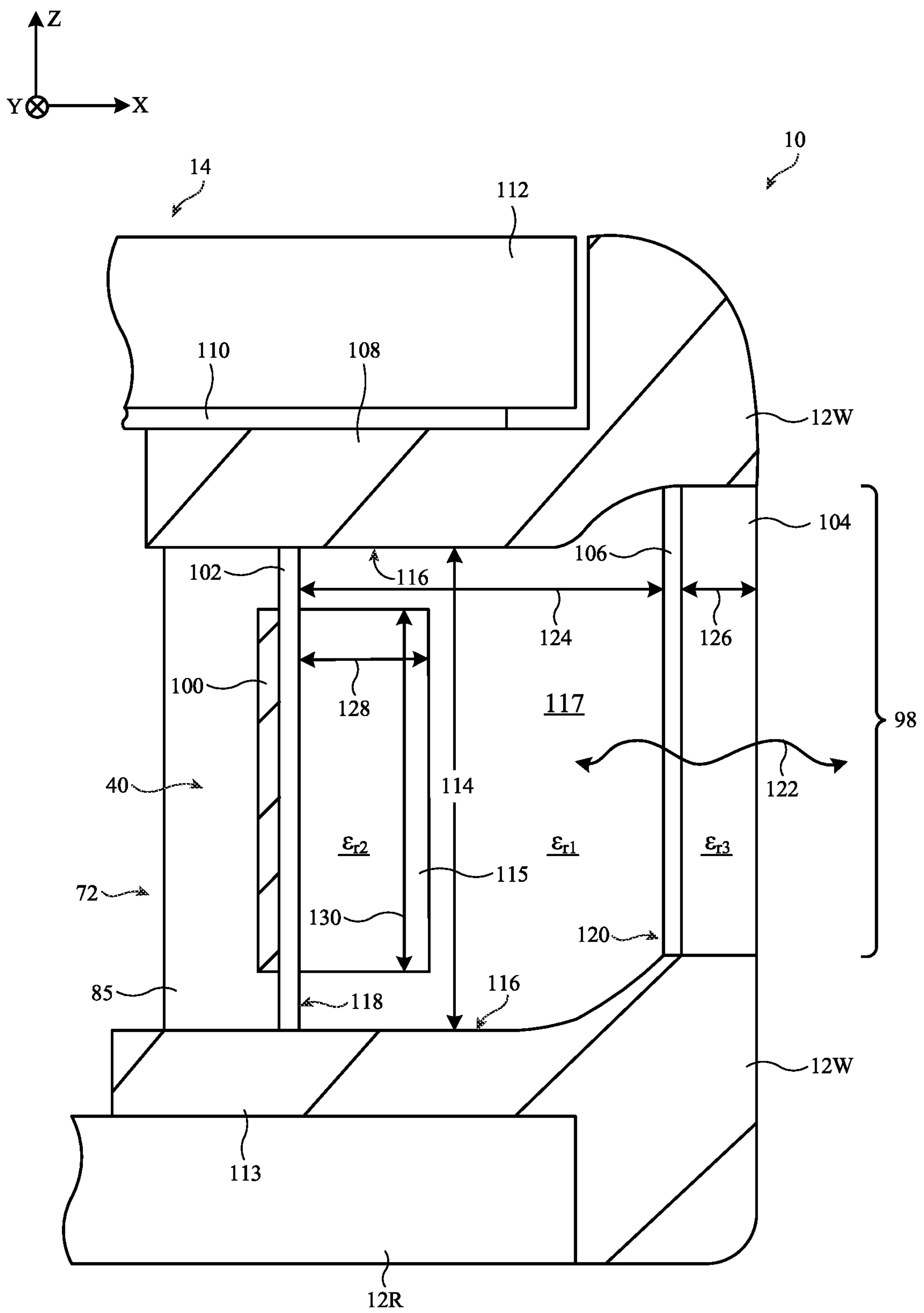
FIG. 9 is a cross-sectional side view of an illustrative electronic device having an antenna that radiates through an aperture having a dielectric block and an injection-molded filler in accordance with some embodiments.

Apertures 98 may have any desired shape. In the example of FIG. 9, apertures 98 are rectangular. Each aperture 98 may have a corresponding length L and width W. Length L and width W may be selected establish resonant cavity modes within apertures 98 (e.g., electromagnetic waveguide modes that contribute to the radiative response of antennas 40). Length L may, for example, be selected to establish a horizontally-polarized resonant cavity mode for aperture 98 and width W may be selected to establish a vertically-polarized resonant cavity mode for aperture 98. At the same time, if care is not taken, impedance discontinuities between the antennas in the antenna module and free space at the exterior of device 10 may introduce undesirable signal reflections and losses that limits the overall gain and efficiency for the antennas. Apertures 98 may therefore also serve as an impedance transition between the antenna module and free space at the exterior of device 10 that is free from undesirable impedance discontinuities.

In scenarios where antennas 40 include dual-polarization antennas (e.g., with at least two antenna feeds as shown in FIG. 5), the radio-frequency signals propagating through and exciting apertures 98 may be subjected to different impedance loading depending on whether the signals are horizontally or vertically polarized. For example, vertically polarized signals may be subjected to a first amount of impedance loading whereas horizontally polarized signals are subjected to a second amount of impedance loading during excitation of and propagation through apertures 98.

In order to help mitigate this differential impedance loading, length L may be selected to be greater than width W. This may serve to match the vertically polarized resonant mode of apertures 98 to the vertically polarized resonant mode of antennas 40 while also matching the horizontally polarized resonant mode of apertures 98 to the vertically polarized resonant mode of antennas 40. At the same time, apertures 98 may have a tapered shape such that the area of the aperture increases as the aperture extends from the antenna to the exterior of device 10. This may help to establish a smooth impedance transition from the antenna module to free space at the exterior of device 10 for both the horizontally and vertically polarized signals.

In practice, it may be desirable for apertures 98 to be as small as possible for cosmetic purposes and to maximize the structural integrity of peripheral conductive housing structures 12W. However, reducing the size of apertures 98 may undesirably limit the ability of the antennas aligned with apertures 98 to radiate with satisfactory antenna efficiency at relatively low frequencies, such as frequencies around 24.5 GHz. In order to allow aperture 98 to be as small as possible while still allowing the antennas to radiate down to frequencies as low as 24.5 GHz and while still allowing the aperture to form a smooth impedance transition between the antenna and free space, each aperture 98 may include first and second substrates having different dielectric constants that configure the aperture to have a greater effective dielectric constant relative to scenarios where only a single substrate fills the aperture.

FIG. 9 is a cross-sectional side view showing how a given aperture 98 may include first and second substrates having different dielectric constants (e.g., as taken in the direction of line AA' of FIG. 8). As shown in FIG. 9, antenna module 72 may be mounted within the interior of device 10 in a vertical orientation such that antenna 40 is aligned with a corresponding aperture 98 in peripheral conductive housing structures 12W. Each antenna 40 in antenna module 72 may radiate through a respective aperture 98, for example. When arranged in this way, the antenna layers of substrate 85 (e.g., antenna layers 86 of FIG. 6) in antenna module 72 may face peripheral conductive housing structures 12W, whereas the transmission line layers of substrate 85 (e.g., transmission line layers 84 of FIG. 6) may face the interior of device 10.

Peripheral conductive housing structures 12W may have a first inwardly-protruding portion such as ledge 108 and a second inwardly-protruding portion such as lip 113. Some or all of antenna module 72 may be vertically interposed between lip 113 and ledge 108. Display 14 may be mounted to ledge 108. For example, display 14 may have a display cover layer such as display cover layer 112. A layer of adhesive such as adhesive 110 may be used to adhere display cover layer 112 to ledge 108. Rear housing wall 12R may be coupled to peripheral conductive housing structures 12W (e.g., at lip 113).

Aperture 98 may allow antenna 40 to convey radio-frequency signals 122 through peripheral conductive housing structures 12W. A dielectric cover layer such as dielectric cover layer 104 (sometimes referred to herein as antenna window 104) may overlap aperture 98 to protect antenna 40 and the interior of device 10 from damage or contaminants. Antenna window 104 may be formed from glass, plastic, sapphire, ceramic, or other dielectric materials.

Aperture 98 may define a cavity such as cavity 114 within peripheral conductive housing structures 12W. Cavity 114 may have non-linear cavity walls such as cavity walls 116 defined by the conductive material in peripheral conductive housing structures 12W (e.g., the conductive material in ledge 108, lip 113, and other portions of peripheral conductive housing structures 12W). Cavity walls 116 may have a tapered or offset profile that allows antenna module 72 to be mounted within the interior of device 10 even if aperture 98 is not precisely aligned with the center of device 10 or the location where antenna module 72 is mounted. The shape of cavity walls 116 may configure cavity 114 to have the same height at antenna 40 as at antenna window 104 or may, if desired, configure cavity 114 to have a tapered shape in which the cavity is larger at antenna window 104 than at antenna 40. This example is merely illustrative and, in general, cavity walls 116 may be linear or may have other shapes.

Conductive material in antenna module 72 (e.g., ground traces, the fences of conductive vias 88 shown in FIG. 6, etc.) may be aligned with and/or coupled to cavity walls 116 around the periphery of antenna 40. This may effectively form a single continuous electromagnetic cavity for antenna 40 that includes both an antenna cavity on antenna module 72 (e.g., antenna cavity 92 of FIG. 6) and cavity 114 in aperture 98 (e.g., a single continuous cavity having conductive cavity walls defined by cavity walls 116 from the exterior surface of peripheral conductive housing structures 12W to antenna 40 and defined by conductive vias and ground traces within the antenna layers of substrate 85).

Cavity 114 may be filled with first and second dielectric substrates having different dielectric constants. For example, as shown in FIG. 9, cavity 114 may be filled with a first dielectric substrate 117. A second dielectric substrate such as dielectric substrate 115 may embedded (e.g., molded) or placed within first dielectric substrate 117 to help dielectrically load cavity 114. First dielectric substrate 117 may be formed from a first material having a first dielectric constant $\varepsilon_{r1}$. Second dielectric substrate 115 may be formed from a second material having a second dielectric constant $\varepsilon_{r2}$. Second dielectric constant $\varepsilon_{r2}$ is different from first dielectric constant $\varepsilon_{r1}$. In one suitable arrangement that is described herein as an example, second dielectric constant $\varepsilon_{r2}$ is greater than first dielectric constant $\varepsilon_{r1}$. Antenna window 104 may have a third dielectric constant $\varepsilon_{r3}$ that is different from dielectric constants $\varepsilon_{r2}$ and $\varepsilon_{r1}$ or that is the same as one of dielectric constants $\varepsilon_{r2}$ or $\varepsilon_{r1}$.

First dielectric substrate 117 and second dielectric substrate 115 may be formed from any desired dielectric materials. In one suitable arrangement that is described herein as an example, first dielectric substrate 117 is formed from injection-molded plastic. First dielectric substrate 117 may therefore sometimes be referred to herein as injection-molded plastic substrate 117. In one suitable arrangement that is described herein as an example, second dielectric substrate 115 is formed from a block or plug of dielectric material such as ceramic, zirconia, glass, doped materials (e.g., epoxy with nanoparticles and/or silica particles), or any other desired materials. Second dielectric substrate 115 may therefore sometimes be referred to herein as dielectric block 115 or dielectric plug 115. Dielectric block 115 may be embedded within injection-molded plastic substrate 117. If desired, injection-molded plastic substrate 117 may fill the remainder of cavity 114 that is not occupied by dielectric block 115 (e.g., injection-molded plastic substrate 117 may form an injection-molded plastic filler for cavity 114).

Injection-molded plastic substrate 117 may extend from a first surface 118 at antenna module 72 to a second surface 120 at antenna window 104. If desired, a layer of adhesive such as adhesive 106 may be used to help adhere injection-molded plastic substrate 117 to antenna window 104. Adhesive 106 may be sufficiently thin (e.g., as measured parallel to the X-axis of FIG. 9) so that the adhesive does not significantly impact the propagation of radio-frequency signals 122 through aperture 98. Antenna module 72 (e.g., antenna layers 86 of FIG. 6) may be pressed against surface 118 of injection-molded plastic substrate 117. If desired, a layer of adhesive such as adhesive 102 may be used to help affix antenna module 72 to injection-molded plastic substrate 117. Adhesive 102 may be sufficiently thin so as not to impact the propagation of radio-frequency signals 122 through aperture 98.

Antenna 40 may include an upper-most patch element 100 (e.g., an upper-most patch element from the set of patch elements 91 of FIG. 6). Upper-most patch element 100 may be patterned on the uppermost antenna layer of dielectric substrate 85 or, if desired, one or more dielectric layers 80 (FIG. 6) may be layered over upper-most patch element 100. Dielectric block 115 may be placed within cavity 114 at a location such that the lateral area of dielectric block 115 (e.g., as measured parallel to the Y-Z plane of FIG. 9) overlaps some or all of the lateral area of upper-most patch element 100.

Dielectric block 115 and injection-molded plastic substrate 117 may be assembled within cavity 114 using any desired manufacturing techniques. As one example, injection-molded plastic 117 may first be injection-molded into cavity 114. Then, a hole or opening may be drilled or milled into injection-molded plastic substrate 117 (e.g., at surface 118). Dielectric block 115 may then be placed into the hole and antenna module 72 may be pressed against dielectric block 115. If desired, dielectric block 115 may be mounted to antenna module 72 and then the antenna module having dielectric block 115 may be pressed against injection-molded plastic substrate 117 such that dielectric block 115 is inserted into the hole in injection-molded plastic substrate 117. As another example, dielectric block 115 (alone or attached to antenna module 72) may be held in place within cavity 114 (e.g., from the interior of device 10) and then injection-molded plastic substrate 117 may be injection molded around dielectric block 115. As yet another example, a first shot of injection-molded plastic for injection-molded plastic substrate 117 may be inserted into cavity 114, then dielectric block 115 may be placed within cavity 114, and then a second shot of injection-molded plastic for injection-molded plastic substrate 117 may be inserted into cavity 114 over dielectric block 115, thereby affixing dielectric block 115 in place within cavity 114.

Cavity 114 may form a waveguide radiator for antenna 40. For example, during signal transmission, the patch elements in antenna 40 may be excited (e.g., by at least antenna feed terminals 62V and 62H of FIG. 5) to radiate radio-frequency signals. The radio-frequency signals may couple into cavity 114 and may electromagnetically excite one or more resonant cavity modes of cavity 114. This may cause cavity 114 to serve as a waveguide radiator that radiates corresponding radio-frequency signals 122 into free space. Conversely, radio-frequency signals 122 received from free space may excite the resonant cavity modes of cavity 114, which may in turn produce antenna currents on the patch elements that are then received by millimeter/centimeter wave transceiver circuitry 38 (FIG. 3). Cavity 114 may therefore also sometimes be referred to herein as waveguide 114, resonant waveguide 114, waveguide resonator 114, radiating waveguide 114, or waveguide radiator 114.

As shown in FIG. 9, antenna window 104 may have a thickness 126. Injection-molded plastic substrate 117 and thus cavity 114 may have a thickness 124. Dielectric block 115 may have a thickness 128 and a width 130. Width 130 may extend across some or all of the height of cavity 114 (e.g., as measured parallel to the Z-axis). Thickness 128 may be less than width 130 and less than thickness 124. Thickness 126 may be less than thickness 124. This example is merely illustrative. In general, dielectric block 115 may have any other desired shape. Dielectric constant $\varepsilon_{r3}$ may be 5.0-6.0, 5.3-5.7, 5.5, or other values (e.g., in scenarios where antenna window 104 is formed from glass). Antenna window 104 may also have a loss tangent tan δ that is around 0.03 or other values. The height of cavity 114, thickness 124, and the shape of cavity walls 116 may be selected to help antenna 40 radiate within desired frequency bands of operation. As one example, thickness 126 may be between 0.1 and 1.0 mm, between 0.2 and 0.8 mm, between 0.4 and 0.6 mm, about 0.5 mm, or other thicknesses.

In some scenarios, the antenna layers in dielectric substrate 85 have a relatively low dielectric constant (e.g., between around 3.0 and 4.0). In these scenarios, the dielectric constant of the antenna layers is similar to that of injection-molded plastic substrate 117 such that there is a relatively smooth impedance transition through cavity 114. However, in order to minimize the size of antenna module 32 and/or maximize the bandwidth of antenna 40, the antenna layers may instead have a relatively high dielectric constant (e.g., between around 5.0 and 6.0 with a loss tangent value tan δ that is around 0.011). In these scenarios, in the absence of dielectric block 115, the dielectric constant $\varepsilon_{r3}$ of injection-molded plastic substrate 117 may be too low to allow for a smooth impedance transition through cavity 114 at all desired frequencies of operation. This may, for example, prevent antenna 40 from radiating with sufficient antenna efficiency at relatively low frequencies such as frequencies around 24.5 GHz.

Inclusion of dielectric block 115 may serve to dielectrically load cavity 114 by increasing the overall effective dielectric constant of cavity 114, thereby allowing antenna 40 to recover satisfactory antenna efficiency at relatively low frequencies around 24.5 GHz. The overall effective dielectric constant of cavity 114 may be determined by a weighted average of dielectric constants $\varepsilon_{r1}$ and $\varepsilon_{r2}$ (e.g., where each dielectric constant is weighted based on how much of cavity 114 is filled with material of that dielectric constant). For example, the ratio of the volume of injection-molded plastic substrate 117 to the volume of dielectric block 115 (e.g., as given by thickness 128 and width 130 of dielectric block 115), as well as the materials used to form dielectric block 115 and injection-molded plastic substrate 117, may be selected to provide cavity 114 with a desired overall effective dielectric constant. The effective dielectric constant may be less than dielectric constant $\varepsilon_{r2}$ of dielectric block 115 but greater than dielectric constant $\varepsilon_{r1}$ of injection-molded plastic substrate 117. This effective dielectric constant may be approximately equal to (e.g., within 20% of) the dielectric constant of both the antenna layers in dielectric substrate 85 and the dielectric constant of antenna window 104, thereby ensuring a smooth impedance transition between the antenna and free space and allowing the antenna to exhibit satisfactory antenna efficiency at relatively low frequencies.

As an example, thickness 124 may be between 1.0 and 1.5 mm, between 1.2 and 1.5 mm, approximately 1.25 mm, or other values. Thickness 128 may be between 0.5 and 1.0 mm, between 0.3 and 1.2 mm, between 0.7 mm and 0.9 mm, or other values. Width 130 may be between 2.0 and 3.0 mm, between 2.3 and 2.5 mm, between 2.2 and 2.6 mm, or other values. In examples where dielectric block 115 has a rectangular profile (e.g., as viewed in the +X direction), dielectric block 115 may have a square profile or may have a length perpendicular to width 130 that is different from width 130. Dielectric constant $\varepsilon_{r1}$ of injection-molded plastic substrate 117 may be between 3.5 and 3.9, between 3.6 and 3.8, about 3.7, or other values. Dielectric constant $\varepsilon_{r2}$ may be about 8.0-12.0, 9.0-11.0, 9.5-10.5, 10, 7-13, or any other desired value that is greater than dielectric constant $\varepsilon_{r1}$. Dielectric block 115 may also have a loss tangent value tan δ that is around 0.008 or other values. When configured in this way, cavity 114 may exhibit an overall effective dielectric constant that is about 5.0-6.0 (e.g., 5.5-5.7, 5.4-5.8, etc.), which is approximately equal to the dielectric constant of the antenna layers in dielectric substrate 85 and antenna window 104. This may thereby configure cavity 114 to form a smooth cavity and impedance transition between antenna 40 and free space, while also maximizing antenna efficiency at relatively low frequencies such as frequencies around 24.5 GHz, without requiring an increase in the size of aperture 98. These examples are merely illustrative and other dielectric constants, lengths, widths, and thicknesses may be used if desired.

The example of FIG. 9 is merely illustrative. Cavity 114 may have other shapes. Dielectric block 115 need not be placed at surface 118 and may, if desired, be placed at other locations within cavity 114 (e.g., floating within injection-molded plastic substrate 117, along one or more cavity walls 116, at surface 120, etc.). If desired, multiple dielectric blocks 115 may be embedded in injection-molded plastic substrate 117 to further tweak the overall effective dielectric constant of cavity 114. The dielectric blocks 115 may be stacked on top of each other if desired. Each of the dielectric blocks 115 may have the same size and/or dielectric constant or may have different sizes and/or dielectric constants. Dielectric block 115 may have other shapes if desired.

Figure 10:
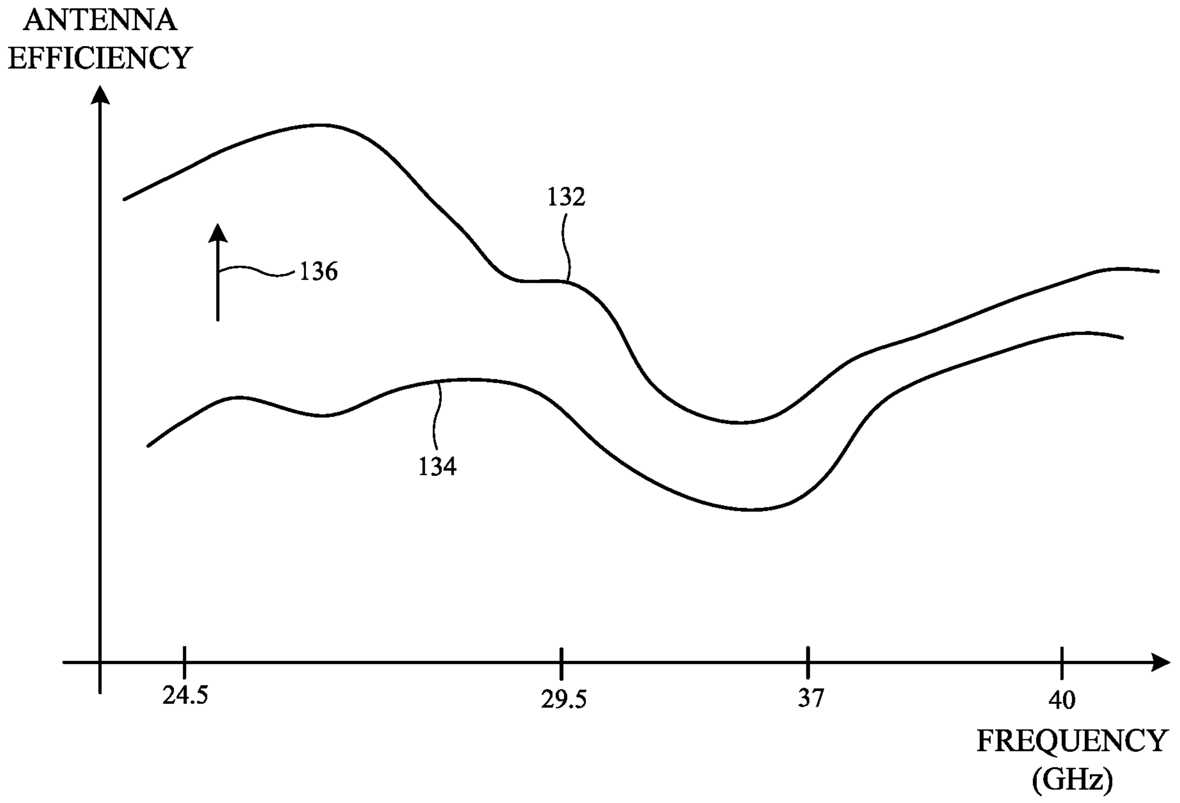
FIG. 10 is a plot of antenna performance (antenna efficiency) as a function of frequency for an illustrative antenna that radiates through an aperture in peripheral conductive housing structures in accordance with some embodiments.

FIG. 10 is a plot of antenna performance (antenna efficiency) for antenna 40 of FIG. 9. Curve 134 plots the antenna efficiency of antenna 40 when cavity 114 is only filled with injection-molded plastic substrate 117. As shown by curve 134, antenna 40 may exhibit relatively low efficiency at low frequencies around 24.5 GHz. Curve 132 plots the antenna efficiency of antenna 40 when cavity 114 is provided with dielectric block 115 in addition to injection-molded plastic substrate 117. As shown by curve 132, the effective dielectric constant created for cavity 114 by the inclusion of dielectric block 115 may increase the efficiency of antenna 40 at 24.5 GHz, as shown by arrow 136, thereby allowing antenna 40 to convey data at these lower frequencies in addition to frequencies up to 29.5 GHz and around 37-40 GHz. The example of FIG. 10 is merely illustrative. Curves 132 and 134 may have other shapes. Antenna 40 may radiate in any desired number of frequency bands at any desired frequencies greater than 10 GHz.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising: a housing having a conductive wall with a cavity; a first dielectric substrate in the cavity and having a first dielectric constant; an antenna at least partially overlapping the cavity; and a second dielectric substrate embedded in the first dielectric substrate and at least partially overlapping the antenna, wherein the second dielectric substrate has a second dielectric constant that is different than the first dielectric constant and the antenna is configured to radiate through the first dielectric substrate, the second dielectric substrate, and the cavity.

2. The electronic device of claim 1, further comprising:
an antenna window overlapping the cavity, wherein the first dielectric substrate extends from the antenna to the antenna window.

3. The electronic device of claim 2, further comprising:
a layer of adhesive that adheres the antenna window to the first dielectric substrate.

4. The electronic device of claim 2, wherein the antenna window has a third dielectric constant that is different than the first dielectric constant and the second dielectric constant.

5. The electronic device of claim 1, wherein the second dielectric constant is greater than the first dielectric constant.

6. The electronic device of claim 1, wherein the first dielectric substrate comprises injection-molded plastic.

7. The electronic device of claim 1, wherein the second dielectric substrate comprises a material selected from the group consisting of: ceramic and zirconia.

8. The electronic device of claim 1, wherein the cavity has a resonant waveguide mode configured to contribute to a radiative response of the antenna.

9. The electronic device of claim 1, wherein the antenna is configured to radiate at a frequency greater than 10 GHZ.

10. The electronic device of claim 1, wherein the conductive wall forms part of peripheral conductive housing structures that extend around a periphery of the electronic device.

11. The electronic device of claim 1, wherein the antenna comprises conductive traces on a dielectric substrate having a third dielectric constant that is different from the first dielectric constant and the second dielectric constant.

12. An electronic device comprising:
a conductive sidewall;
a cavity in the conductive sidewall;
a dielectric substrate in the cavity;
a dielectric block embedded in the dielectric substrate; and
an antenna that at least partially overlaps the dielectric block, the antenna being configured to convey radio-frequency signals through the cavity, the dielectric block, and the dielectric substrate.

13. The electronic device of claim 12, wherein the dielectric substrate comprises plastic.

14. The electronic device of claim 13, wherein the plastic comprises injection molded plastic.

15. The electronic device of claim 12, wherein the dielectric block comprises ceramic.

16. The electronic device of claim 12, wherein the dielectric block comprises zirconia.

17. The electronic device of claim 12, wherein the antenna comprises conductive traces on a printed circuit, further comprising a layer of adhesive that attaches the printed circuit to the dielectric block.

18. An electronic device comprising:
a conductive wall;
an aperture in the conductive wall;
a waveguide resonator in the conductive wall and extending from the aperture;
a patch element configured to excite a resonant mode of the waveguide resonator;
a first dielectric substrate in the waveguide resonator and having a first dielectric constant; and
a second dielectric substrate in the first dielectric substrate, the second dielectric substrate having a second dielectric constant that is different from the first dielectric constant.

19. The electronic device of claim 18, wherein the first dielectric substrate-comprises injection-molded plastic and the second dielectric substrate comprises a dielectric block embedded in the injection-molded plastic.

20. The electronic device of claim 18, wherein the second dielectric constant is greater than 8.0.

* * * * *